United States Patent

Morine

[15] 3,664,002
[45] May 23, 1972

[54] IRRIGATION PIPE TRANSFER APPARATUS

[72] Inventor: Reuben H. Morine, 250 Baldwin Ave., Apt. 812, San Mateo, Calif. 94401

[22] Filed: June 30, 1971

[21] Appl. No.: 158,205

[52] U.S. Cl. .............................................29/200 D, 29/431
[51] Int. Cl. ......................................................B23p 19/00
[58] Field of Search................29/200 D, 200 A, 200 R, 431, 29/429, 430

[56] References Cited

UNITED STATES PATENTS 3,350,769  11/1967  Berry.....................................29/431

Primary Examiner—Thomas H. Eager
Attorney—Oscar A. Mellin et al.

[57] ABSTRACT

Apparatus is disclosed comprising a mobile platform having a universally mounted extensible boom thereon for selectively grasping a pipe section branching off of a main irrigation pipeline, moving it out of locking engagement with a pipe connection thereon, then transferring the pipe section to a remote location along the main pipeline. The apparatus includes means for maintaining the orientation of the transferred pipe section so that the same end which is unlocked from the pipe connection is presented at the remote location for connection and the pipe section is in proper position for operation.

11 Claims, 7 Drawing Figures

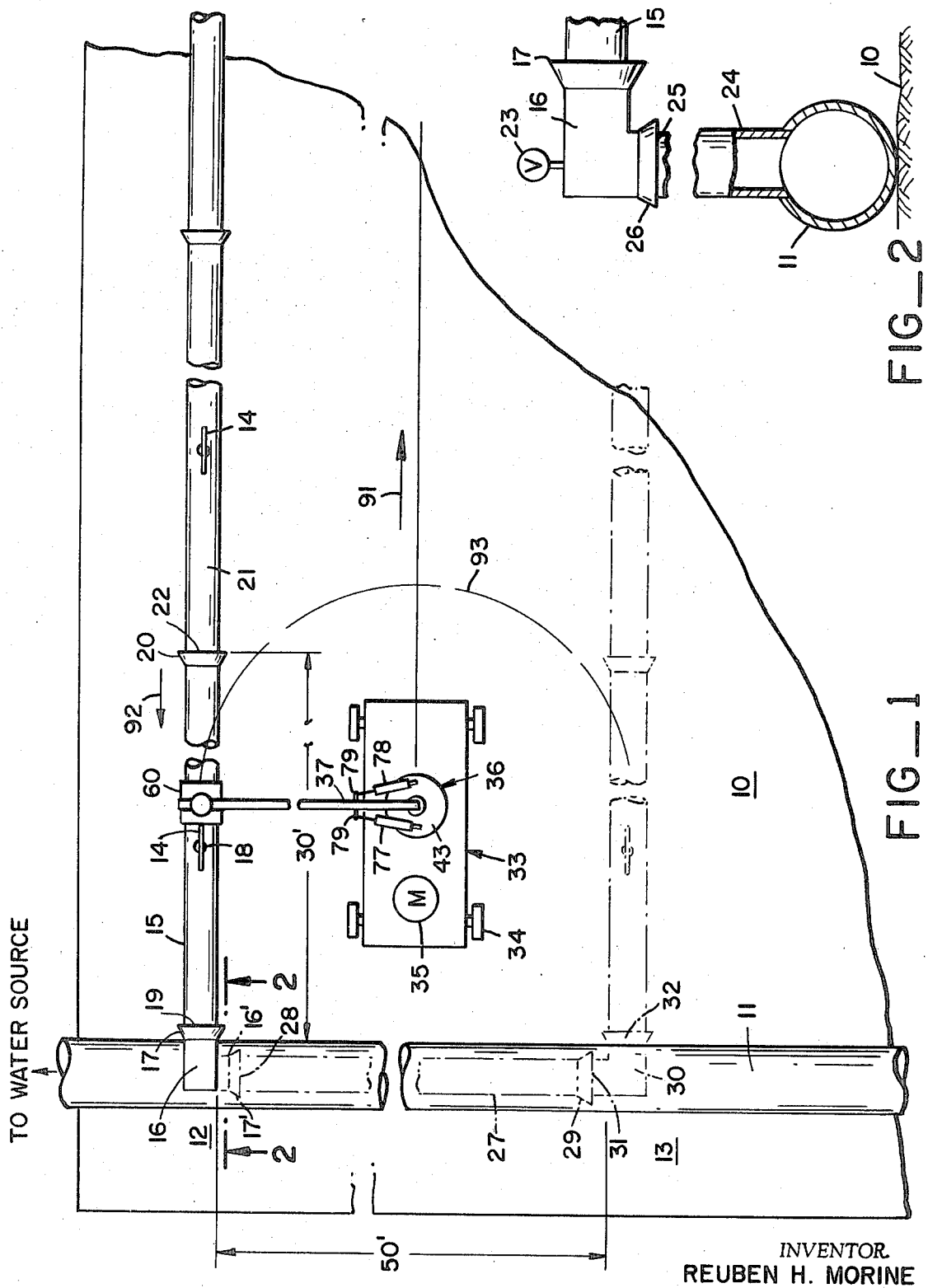

Patented May 23, 1972
3,664,002
2 Sheets-Sheet 2
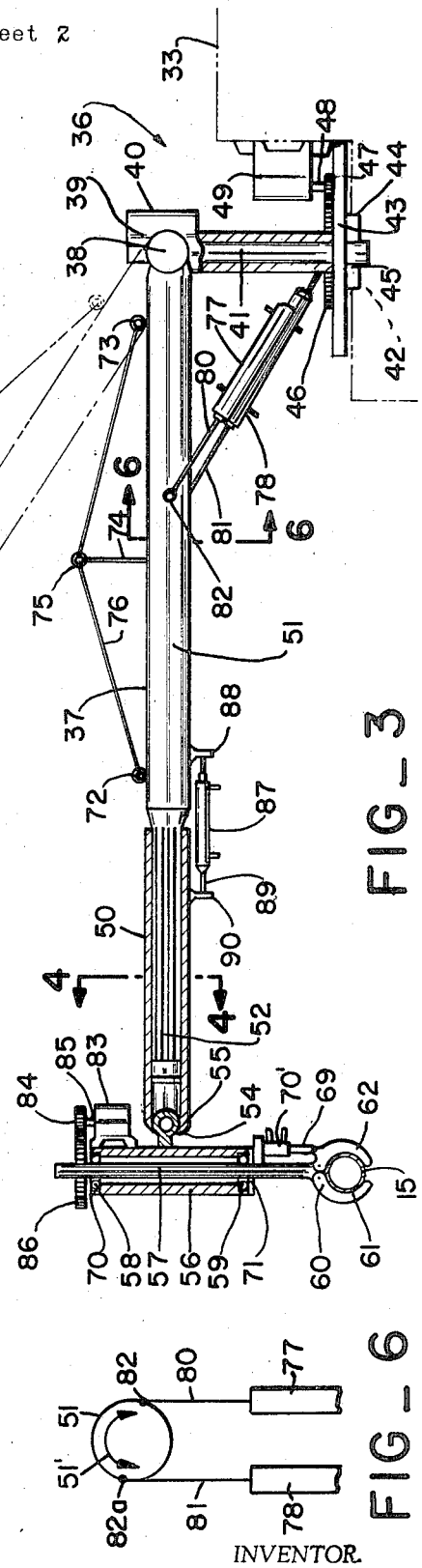
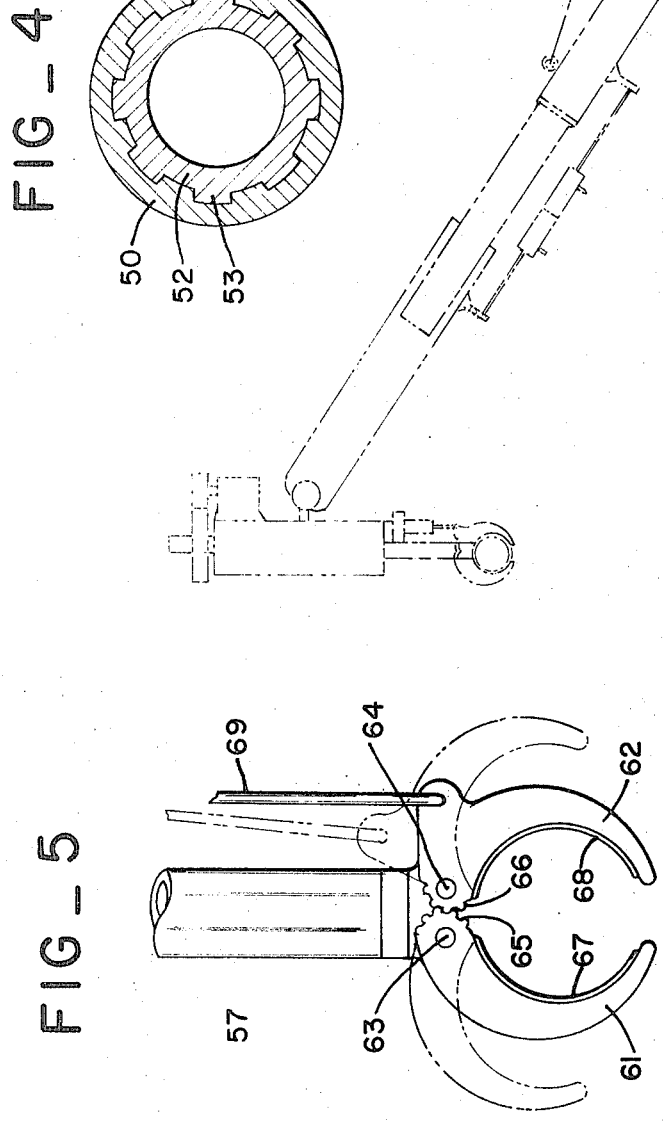
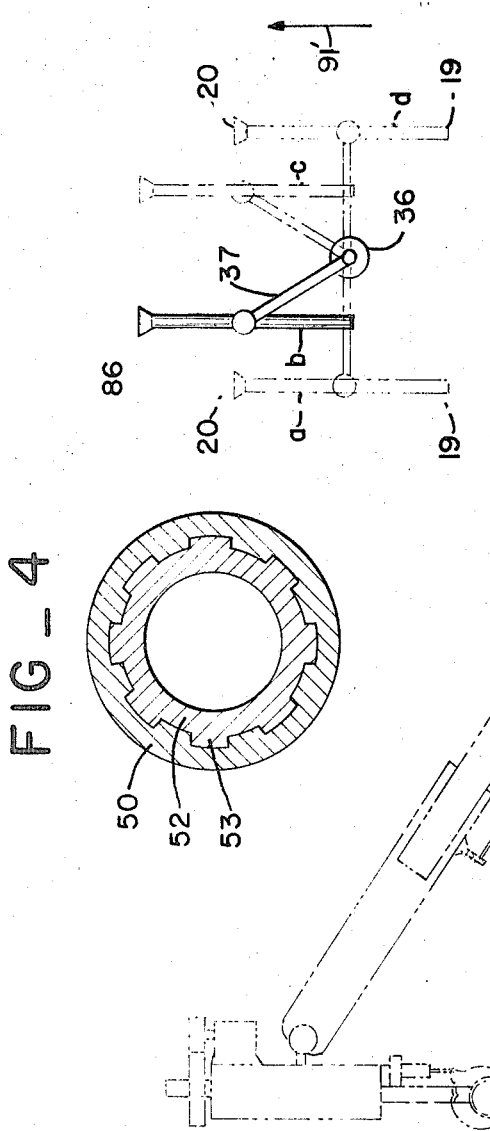
INVENTOR.
RUBEN H. MORINE
BY
Mellin, Moore & Weisenberger
ATTORNEYS

3,664,002

IRRIGATION PIPE TRANSFER APPARATUS

BACKGROUND OF THE INVENTION

1. Field of the Invention

The invention relates to apparatus for the transfer of pipe sections; and, more particularly, to a mobile apparatus for transferring a pipe section from one location to another along an irrigation pipeline.

2. Description of the Prior Art

It is known in the art of irrigation to distribute water to fields of crops or the like through sprinkler heads for overhead watering by laying sections of irrigation pipe having risers with sprinkler heads thereon between the rows of the crops. As a general rule, this is accomplished by laying a main pipeline across the field carrying water therethrough. A series of pipe extensions each having a riser with a sprinkler head thereon are manually arranged in end to end connection off of the main pipeline to distribute the water over a selected area of the field. This is generally accomplished by manually grasping the pipe extension, unlocking it from its connection to the main pipeline, then walking across the field and locking it to a connection at a second location along the main pipeline which may be 50 feet or so away.

In addition to the manual labor required, the pipe section may be relatively heavy and cumbersome, as, for example, sections of 3-inch aluminum pipe about 30 feet in length and weighing about 18 pounds each. Thus, in addition to being laborious and time-consuming, the manual relocation of such pipe sections is fatiguing, especially if they must be transferred over a field covering a large area or if the crops in the field have attained a substantial size.

There thus exists a need for carrying out the transfer of such a pipe section from one location to another. However, special problems arise in this area. Coupling between the pipe section and the connections on the main line generally involve couplers thereon whereby a male (or female) pipe connecting end on the pipe section lockingly telescopes with a female (or male) pipe connecting end on the pipe connection. Disengagement is accomplished by turning or twisting such pipe sections about their longitudinal axis until unlocking is accomplished. Further, when the pipe section is unlocked and transferred to its second location, the male (or female) end thereon must be properly oriented to engage the female (or male) end on the pipe connection at the second location with the risers and sprinkler heads in operating position. Up to this time, no satisfactory apparatus has been provided for solving these problems.

SUMMARY OF THE INVENTION

It is an object of this invention to provide a means for transferring pipe sections of an irrigation pipeline from one location thereon to another.

It is further object of this invention to provide such pipe section transfer apparatus which is capable of maintaining the orientation of the pipe section while it is being transferred from the first location to the second.

It is a still further object of this invention to provide mobile means for carrying out the foregoing objects which can be readily moved along the field traversed by the pipeline.

These and other objects are accomplished according to this invention by apparatus comprising a mobile platform having a universally mounted extensible boom thereon for selectively grasping a pipe section branching off of a main irrigation pipeline, moving it out of locking engagement with a pipe connection thereon, then transferring the pipe section to a remote location along the same pipeline and placing it in locking engagement with a further pipe connection. The apparatus includes means for controlling the orientation of the transferred pipe section so that the same end which is unlocked from the pipe connection may be presented at the remote location and the pipe section may be connected and disconnected from pipe connections under all conditions of terrain.

BRIEF DESCRIPTION OF THE DRAWING

FIG. 1 is a plan view, partly schematic, of a field being irrigated by a pipeline system to which the apparatus of this invention is applicable;

FIG. 2 is a detailed view of a portion of the pipeline system of FIG. 1 taken along lines 2—2;

FIG. 3 is a vertical view of a portion of the mobile unit of this invention for carrying out the techniques of this invention associated with the field of FIG. 1;

FIG. 4 is a sectional view taken along the line 4—4 of FIG. 3;

FIG. 5 is a detailed view of a portion of the unit of FIG. 3;

FIG. 6 is a view taken along lines 6—6 of FIG. 5 with portions omitted for convenience of illustration; and FIG. 7 is a schematic illustration of the techniques of my invention using the unit of FIG. 3 on a pipe section traversing the field of FIG. 1.

DESCRIPTION OF THE PREFERRED EMBODIMENT

Referring now to FIG. 1 of the drawing, a field 10 is shown having crops or the like growing thereon. The field 10 is located on land to be irrigated by overhead watering or sprinkling. A main pipeline 11 is shown traversing field 11. Pipeline 11 is adapted to receive water under pressure from a remote source (not shown). A plurality of extension pipe stations are spaced along pipeline 11, such stations 12 and 13 being shown for convenience of illustration. A pipe extension section 15 is shown branching off of main pipeline 11 at a first pipe connection 16 located on a suitable standpipe at the first station 12. This pipe connection 16 is a conventional fitting, having one end connected through suitable means (not shown) to main pipeline 11 and in fluid communication therewith and a female pipe connection 17 at the other end. Locking engagement is provided between pipe extension section 15 and the female pipe connecting end 17 of pipe connection 16 to provide fluid communication between main pipeline 11 and pipe extension section 15. A conventional riser 18 is disposed along pipe extension section 15 and extends vertically upwardly therefrom. This riser 18 is generally disposed about the midpoint of pipe extension section 15, which extension may be about 30 feet or so in length. The riser 18 includes a generally horizontal sprinkler head 14 at the top thereof and is adapted to spray a large area of field 10. For example, it may be assumed that the distance between station 12 and 13 is about 50 feet or so. Riser 18 thus sprays about 25 feet or so on each side of pipe extension section 15. Further, pipe extension section 15 is only a part of an extension system leading from main pipeline 11; for example, this system, comprised of a plurality of pipe extension sections similar to extension section 15, may extend one-quarter of a mile or more.

However, in either case, each pipe extension section 15 generally includes a male pipe connection end 19 and a female pipe connection end 20. As shown in FIG. 1, the male end 19 of extension section 15 telescopingly locks into the female end 17 of pipe connection 16 at station 12. A like extension section 21 has a male end 22 telescopingly locking into the female end 20 of extension section 15, and so on to the end of the pipe extension system. Of course, the reverse could be true — that is, a female end onto a male end, etc., but this is not preferred for reasons to be discussed further hereinbelow.

The locking of one pipe extension section into another and the extension section 15 into pipe connection 17 is accomplished using any suitable coupling system. One such ball coupler system is well known in the irrigation art and these couplers are manufactured, for example, by the W. R. Ames Company, of Milpitas, California. This type of locking system requires that the male end of a pipe or the like be pushed into a female end of a pipe or the like to lock them together, then be rotated about its longitudinal axis a slight distance to unlock. The degree of rotation is generally about 20° or so. Another type of coupling system which can be used with this invention is the coupler manufactured by the John Bean Division of FMC Corporation of Lansing, Michigan, under the trade name Shur-Rane. Thus, any couplers may be used which involve pushing of one pipe section into another to lock, then twisting and pulling to unlock, or any combination of the above.

In operation, only the extension system leading from the pipe connection 16 at station 12 is in place. Water is passed through main pipeline 11 and through extension sections 15, 21, etc., and out their respective risers to irrigate the crops on each side thereof. Such irrigation may also be provided on the other side of pipeline 11. This would be accomplished by replacing pipe connection 16 with a connection (not shown) having a like extension system extending from like female connection (also not shown) on both sides of pipeline 11. The foregoing would be true of the remaining stations along pipeline 11 to be discussed further hereinbelow and are only omitted for convenience of illustration.

After the desired irrigation is carried out using pipe extension sections 15, 21, etc., the flow of water through pipe connection 16 is shut off using a suitable valve 23 (FIG. 2), and the connection 16 is bled of water. Connection 16 is shown in detail in FIG. 2. Thus, standpipe 24 extends vertically upwardly from main pipeline 11 and may have a male end 25 telescopingly locking into a female end 26 on connection 16. In this type of connection, a certain amount of play is possible between connection 16 and pipe extension section 15. Thus, connection 16 can be disconnected from extension section 15 and manually moved (about one-quarter of a turn) to the dotted line position 16' of FIG. 1. A "flopper" line 27 (shown in dotted lines) is inserted into connection 16. Flopper line 27 may be about 50 feet or so in length with about 150 feet or so between standpipes along main pipeline 11. Flopper line 27 thus has a male end 28 at one end which telescopingly locks into the female end 17' of connection 16 and a female end 29 at the other end.

A suitable pipe connection 30 is then placed on the female end 29 of flopper line 27. As shown, connection 30 is an elbow having a male end 31 telescopingly locking at one end into female end 29 and a female end 32 at the other end. Female end 32 opens outwardly in generally the same direction as the female end 17 of connection 16 and the open ends of each lie generally in the same vertical plane.

Thus, it can be seen that the connection of a pipe extension section onto connection 30 must be oriented in the same direction as the coupling to connection 16 (i.e., a male end of a pipe connection must be presented at connection 30). Also, although connection 30 is described and shown as an elbow, obviously other types may be provided, such as a Tee-shaped connection, if irrigation is desired on the other side of line 11 as well.

All of the foregoing has described a conventional operation in order to irrigate a field by overhead or sprinkler watering. Such steps are generally carried out manually. The pipe extension sections 15, 21, etc., may be manually moved from the first pipe extension station 12 to the second station 13. This is accomplished by unlocking pipe extension section 15 from pipe extension section 21, then moving extension section 15 to the connection 30 while maintaining the orientation of each extension section (i.e., so a male end is presented to the female end 32 of connection 30, and the riser 18 is in a vertical position so that the sprinkler head 14 will be operable). The same procedure is repeated for extension section 21 and each succeeding section. Although such steps may be carried out manually, this is extremely laborious and time consuming. For example, the pipe extension sections may range from 2 to 8 inches in diameter and weight from 13 to 85 pounds per 30-foot length and a system of such sections may extend for a quarter mile or more. If the crops in the field have attained substantial size it will be fatiguing if not impossible to step over them in moving the pipe.

Accordingly, it is a particular feature of this invention to use a mobile unit 33 (FIG. 1) to carry out the transfer of the pipe extension sections. Unit 33 preferably includes wheels 34 or the like and a suitable motor 35 for driving unit 33. Unit 33 is adapted to traverse a generally horizontal plane such as field 10 and, in operation, is located midway between the stations involved (e.g., about 25 feet from stations 12 and 13 respectively) for reasons to be seen shortly.

The structure comprising mobile unit 33 will now be described with particular regard to FIGS. 3 through 5. A turntable assembly 36 is mounted on unit 33 for rotation about an axis normal to the generally horizontal plane which the mobile unit 33 traverses as is more fully described below. A boom 37 extensible along a given axis is mounted at one end on turntable assembly 36. In the embodiment shown, this connection is provided by means of a ball 38 connected to one end of boom 37 and received within a socket 39 or the like mounted on a vertically upright shaft 40 of the turntable assembly 36. The socket 39 is designed so that the boom 37 can move with respect to shaft 40 in an arc normal to the generally horizontal plane traversed by the mobile unit 33 while at the same time being capable of rotating about its own axis.

Shaft 40 is generally hollow and may be rotatably mounted on an inner shaft 41 fixed on mobile unit 33 and extending therethrough and through an aperture 42 formed in turntable plate 43. A collar 44 or the like is secured to both inner shaft 41 and mobile unit 33, as by welding or the like. Suitable bushings (bushing 45, for example) and washers or the like (not shown) are provided between turntable plate 43 and mobile unit 33 so that outer shaft 40 and turntable plate 43 turn freely about inner shaft 41.

A ring gear 46 or the like is secured to the lower end of outer shaft 40 and turntable plate 43. A mating gear 47 engages the teeth of gear 46. Gear 47 is mounted on the drive shaft 48 of a suitable motor, such as a hydraulic motor 49, secured to unit 33. It can be seen, then, that the rotation of shaft 48 via motor 49 drives gear 47 which in turn drives gear 46 and shaft 40 to carry the boom 37 in a generally horizontal plane. The motor 49 is adapted to rotate boom 37 and turntable 43 through 360°. Any suitable ratio between gears 46 and 47 may be chosen, as for example, a ratio of 6:1.

Extension of boom 37 is provided by means of a free end extension portion 50. In the embodiment shown, main boom portion 51 includes a splined portion 52 which telescopes into the free end extension portion 50 and the free end extension portion 50 is keyed to boom portion 51 by means of splines 53 (see FIG. 4). This prevents rotation of portion 50 with respect to portion 51 while permitting telescoping extension thereof. Of course, in the embodiment shown any suitable means may be used for keying portions 50 and 51 with respect to each other and in other embodiment of this invention the free end extension portion may be selectively rotatable about the main boom portion 51.

The outer end of extension portion 50 terminates in a socket or clamp 54 (FIG. 3). Joint 54 engages a cylinder 55 which is welded or otherwise secured to the outside of a rigid member 56 elongated on a given axis. The joint obtained thereby should be such to limit movement of the rigid elongated member 56 and its components (to be described) to rotation of the axis of the elongated member about an axis normal to its axis of elongation (i.e., from the solid line position to the dotted line position when the boom 37 is raised any angle or number of degrees from the horizontal as shown in FIG. 3). The cylindrical shape of this joint prevents undesirable twisting action at the clamp joint 54. The rigid elongated member 56 comprises a hollow cylinder, in the embodiment shown, having an axis extending generally normal to the longitudinal axis of boom 37. An inner shaft 57 is mounted centrally of member 56. Shaft 57 passes through suitable bushings 58 and 59 or the like closing off the upper and lower ends of member 56. An adjustable pipe grasping clamp 60 adapted to open and close about a given axis is mounted on the lower end of inner shaft 57. Clamp 60 is shown in detail in FIG. 5 and includes a pair of jaws 61 and 62 pivotally mounted at pivots 63 and 64, respectively, to the lower end of shaft 57. Jaws 61 and 62 include gear teeth 65 and 66, respectively, which are in engagement as shown. As indicated in FIG. 1, the width of jaws 61 and 62 is such that they engage the pipe for a substantial length thereof in order to provide a positive grip for the outer diameter of the pipe sections to be transferred without damage to the pipe sections when sufficient force is applied consistent with the operations to be described hereinbelow. Such jaws need not be solid and may include cushioning means on their inner surfaces, such as a resilient or semi-resilient material as, for example, foamed polyurethane coatings 67 and 68, respectively, for preventing damage to the outer surface of the pipe sections to be transferred while clamping such sections.

The jaws 61 and 62 may be opened and closed about a given axis between the solid-and-dotted-line positions of FIG. 5 by means of a lever 69 coupled at one end to jaw 62 and at the other end to a conventional hydraulically actuated cylinder 70' (FIG. 3) mounted on shaft 57 and operated from a source of pressurized fluid (not shown). Of course, only one of jaws 61 and 62 may be movable, if desired. A pair of collars 70 and 71 are secured to shaft 57 above and below bushings 58 and 59, respectively. These collars prevent shaft 57 from moving along the axis of rigid elongated member 56 but permit shaft 57 to rotate about its own longitudinal axis and may be adjustably secured to shaft 57, as by set screws or the like (not shown) to permit adjusting thereof.

A pair of eyelets 72 and 73 may be mounted on main boom portion 51 at each end thereof with a vertical rod 74 generally spaced halfway therebetween also secured to boom portion 51. A like eyelet 75 is disposed at the top or rod 74 and a truss cable or line 76 passes through eyelet 75 and is secured at each end thereof to eyelets 72 and 73 to provide a conventional truss for boom 37. Appropriate tensioning means for the cable or line 76 may be provided if desired.

A pair of conventional double-acting hydraulic cylinders 77 and 78 are provided secured at one end to turntable plate 43 as shown in FIG. 1 and having their respective piston rods 80 and 81 secured to opposite sides of main boom portion 51 at point 82 (the point of connection 82a of rod 81 being shown in FIG. 6). Referring to FIG. 1 it will be seen that brackets 79 may be provided for connecting the piston rods 80 and 81 of rams 77 and 78 to the boom 37 if desired. The cylinders 77 and 78 may be operated independently of each other from a source of pressurized fluid (not shown). Cylinders 77 and 78 operated as a unit control vertical movement of boom 37. When operated separately or in opposition to each other they control rotational movement of boom 37 about its own axis as illustrated in FIG. 6 and discussed further hereinbelow. From the above it will be seen that boom 37 is substantially universally movable with respect to said mobile unit 33.

As mentioned hereinabove, inner shaft 57 is adapted to rotate about its longitudinal axis. A conventional hydraulic motor 83 (operated from a source of pressurized fluid, not shown) or the like is mounted on member 56 and operatively coupled to shaft 57 by means of a gear 84 coupled to the motor shaft 85 which drives a gear 86 connected to the top of inner shaft 57 to provide rotation thereof (and thus rotate the axis about which clamp 60 is adapted to open and close.) It is desirable that the motor 83 and gears 84, 86 be adapted to allow the shaft 57 to rotate freely when the motor 83 is not energized in order to facilitate the alignment of the axis of the clamp 60 and pipe sections upon engagement.

A conventional hydraulic double-acting cylinder or ram 87 is connected at one end at bracket 88 mounted on main boom portion 51 and the piston rod 89 thereof is connected to a bracket 90 mounted on outer boom extension portion 50. Thus, the boom 37 may be selectively extended and contracted by actuation of ram 87 from a source of pressurized fluid (not shown).

The mobile unit 33 may be any suitable motor-driven vehicle such as a tractor modified to carry out my invention. Although hydraulic motors and cylinders have been described, any suitable motive means may be used to ratote and operate the various mechanisms of FIG. 3, as, for example, chain or V-belt drives, etc. The mobile unit 33 thus would include suitable connections between the various motors and cylinders and controls for operating the same, such as pumps, valves, hoses, couplers, reserve hydraulic fluid tanks, filters, pressure gauges, etc., which would be necessary to complete a hydraulic system.

In operation, as discussed previously, mobile unit 33 is located midway between stations 12 and 13 and thus about 25 feet, for example, from pipe extension section 15. The unit 33 is also generally parallel to extension section 15 and the length of boom 37 is generally related to the distance from pipe extension section 15 and is in the solid-line position of FIG. 3. Cylinders 77 and 78 are actuated to lower the jaws 61 and 62 of clamp 60 in the open dotted-line position of FIG. 5 onto generally the midpoint of pipe extension section 15. By operating cylinders 77 and 78 simultaneously, the boom 37 can be raised and lowered — selective operation of these cylinders 77 and 78 permits clockwise or counter-clockwise rotation of the boom 37 to properly orient the axis about which jaws 61 and 62 open and close with respect to the axis of pipe extension section 15 prior to clamping it thereto as illustrated by the arrow 51' in FIG. 6.

Cylinder 70 is now actuated to clamp jaws 61 and 62 about pipe extension section 15 (FIG. 3). Cylinders 77 and 78 are then actuated to rotate the boom 37 about its own axis and lift the free end of pipe extension section 15 a short distance (e.g., for about 2 to 2 ½ feet) off the ground. Pipe extension section 15 is now twisted or rotated about its longitudinal axis a sufficient distance, for example, about 20°, to unlock female end 20 from the male end 22 of extension section 21 as discussed hereinabove. This is accomplished by actuating cylinder 87 to extend outer boom portion 50 with respect to main boom portion 51 causing member 56 to rotate about clamp joint 54 and clamp 60 to rotate about its clamping axis. Finally, extension section 15 is pulled in the direction of arrow 92 of FIG. 1 a sufficient distance to withdraw female end 20 from male end 22 of extension portion 21. This is accomplished by actuating motor 49 which drives gears 46 and 47 and thus turns turntable 36 to pull for a slight distance the extension section 15.

The pipe extension section 15 is now completely removed from connection to pipe extension section 21 and has its male end 19 oriented in the direction of main pipe line 11. It is now desired to move extension section 15 along arc 93 to the position occupied by the dotted lines of FIG. 1. Referring to FIG. 3, motor 49 is actuated to drive gears 46 and 47 and thus rotate turntable 36 and boom 37 in generally a 180° arc — see FIG. 7. The direction of arrow 91' corresponds to the direction of arrow 91 in FIG. 1. Position a is related to station 12 while position d is related to station 13. Positions b and c are intermediate locations between stations 12 and 13.

During this rotation of boom 37, motor 83 is also actuated to drive gears 84 and 86 to turn shaft 57 and thus pipe extension section 15 carried thereby through generally an angle of 180° to maintain the orientation of extension section 15 so that at position d (FIG. 7) the male end 19 is located in the same position and oriented in the same direction as it was at position a. Thus, at position d, which corresponds to station 13 of FIG. 1, a male end is present which may be telescopingly inserted into the female end 32 of pipe connection 30 and thus locked therein. This is accomplished by actuating motor 49 and gears 46 and 47 to slightly push male end 19 into locking engagement with female end 32 when the pipe extension section 15 is properly aligned by means of motor 83 and cylinders 77, 78 and 87. The pipe extension section 15 is then unclamped by means of cylinder 70.

In addition to presenting the proper end of the pipe extension section for connection at the second station, riser 18 is maintained in a generally vertical position, thereby preventing damage thereto and clogging thereof which would result by turning of the pipe extension section in a manner whereby the generally vertical upstanding riser might be turned into the ground. In addition, for optimum operation, water from the sprinkler head on riser 18 should be maintained as horizontal as possible (i.e., normal to the vertical riser 18).

The female end on the pipe extension section 15 is generally flared outwardly to guide the male end 19 of pipe extension section 21 therein. Thus, if pipe extension section 15 were not properly oriented and turned in a manner which reversed its direction to present a male end at connection 30, the female end 20 of extension section 15 would scoop dirt into the connection 30 when connection was attempted (due to the flaring of the female end 20 on extension section 15).

After the movement of section 15, unit 33 is moved in the direction of arrow 91 in FIG. 1 to section 21 and thus section 21 and all other succeeding sections in turn are moved in like manner. After irrigation at station 13 is accomplished, the foregoing steps are repeated to connect pipe sections to further stations to irrigate the entire field 10.

It can be seen that I have provided an economical and efficient means for quickly transferring pipe extensions along an irrigation pipeline from one location to another. Such a system may be carried out by a single operator and thus is both time and labor-saving. Damage to growing crops is avoided through the use of this apparatus and irrigation may be continued even after crops, such as pineapple or corn, approach full growth when movement of the irrigation pipe by other means is impractical if not impossible.

I claim as my invention:

1. Apparatus for transferring a pipe section from one location to another comprising:
   a mobile platform;
   a selectively extensible boom having a given longitudinal axis mounted at one end to said platform for universal movement with respect to said platform;
   a pipe clamp mounted on the free end of said boom;
   lifting means associated with said boom and said platform for selectively raising and lowering said free end of said boom through a generally vertical arc with respect to said platform;
   pipe clamp rotating means associated with said boom and said clamp for turning said clamp about an axis substantially normal to said longitudinal axis of said boom; and
   boom rotating means associated with said platform and said boom for rotating said free end of said boom in a generally horizontal plane with respect to said platform.

2. The apparatus of claim 1 wherein said pipe clamp includes a hollow elongated rigid member extending transverse to the longitudinal axis of said boom and pivotally connected to said free end of said boom and movable only in a vertical plane generally coincident with the longitudinal axis of said boom, and an inner shaft disposed coaxially of said hollow elongated rigid member and having said pipe clamp mounted at the lower end of said inner shaft.

3. The apparatus of claim 2 wherein said pipe clamp includes a pair of movable jaws and means associated with said platform and said jaws for selectively opening and closing said jaws to clamp said pipe section therein.

4. The apparatus of claim 3 wherein the said jaws are lined on their inner portions with a cushioning material for preventing damage to the outside of said pipe section.

5. The apparatus of claim 1 wherein said boom comprises a main inner boom portion and an outer extensible boom portion, said boom portions being keyed together to prevent rotation about their longitudinal axes of one of said boom portions with respect to the other with said pipe clamp being carried by the free end of said outer extensible boom portion.

6. The apparatus of claim 5 including a single-acting hydraulically actuated cylinder connected to each of said boom portions for selectively extending one of said portions with respect to the other.

7. The apparatus of claim 5 wherein said lifting means includes a pair of double-acting hydraulically actuated cylinders operatively connected at one end to said platform and at their other ends to opposite sides of said main inner boom portion.

8. The apparatus of claim 1 including a turntable mounted on said platform with said boom mounted on said turntable, said boom rotating means including gearing means coupled to both said turntable and motive means mounted on said platform for driving said gearing means.

9. The apparatus of claim 8 including a pair of double-acting hydraulically actuated cylinders connected at one end to said turntable on opposite sides of said boom mounting and at the other end to opposite sides of said boom.

10. Apparatus for transferring a pipe section from a first location on a main pipeline to a second location along said main pipeline with pipe connections being disposed at both locations, said pipe section having a male pipe connecting end at one end in locking engagement with a female pipe connecting end on the pipe connection at said first location, the pipe connection at said second location also having a female pipe connecting end adapted to receive the male end of said pipe section in locking engagement and oriented generally in the same direction as the female end at said first location, the male pipe connecting end of said pipe section being adapted to turn out of locking engagement in said female pipe connecting ends and be pushed into locking engagement therewith, said apparatus comprising:
   a mobile platform;
   pipe section clamping means associated with said platform for clamping said pipe section at said first location;
   lifting means associated with said platform and said pipe section clamping means for lifting said pipe section clamped to said clamping means;
   first pipe section turning means associated with said platform for turning said pipe section abut its longitudinal axis out of locking engagement with the female end at said first location;
   pipe section pulling means associated with said platform for pulling the male end of said pipe section out of engagement with the female end at said first location;
   pipe section rotation means associated with said platform for rotating said pipe section in a generally horizontal plane from said first location to the pipe connection at said second location while turning said pipe section about an axis normal to its longitudinal axis to thereby maintain the male end of said pipe section in generally the same orientation at said second location as it was at said first location;
   pipe section pushing means associated with said platform for pushing the male end of said pipe section into locking engagement with the female end of the pipe connection at said second location;
   lowering means associated with said platform for lowering said pipe section clamped to said clamping means; and
   unclamping means associated with said platform for unclamping said pipe section therefrom.

11. Apparatus for transferring sections of irrigation pipe from a first interconnected position to a second interconnected position comprising:
   a. a mobile platform adapted for movement in a generally horizontal plane;
   b. turntable means mounted on said mobile platform;
   c. an extensible boom having a given axis mounted at one end on such turntable means;
   d. a rigid elongated member having a given axis mounted at the free end of said boom;
   e. pipe clamp means mounted at one end of said rigid elongated member and adapted to open and close about a given clamping axis normal to the given axis of said rigid elongated member;
   f. means for limiting movement of said turntable means with respect to said mobile platform to selective rotation about an axis normal to said generally horizontal plane only;
   g. means for limiting movement of said boom with respect to said turntable means to selective movement through an arc normal to said generally horizontal plane and selective rotation of at least the free end portion of said boom about said given axis of said boom only;

h. means for selectively extending and contracting said extensible boom along said given axis thereof;
i. means for limiting movement of said rigid elongated member with respect to said free end portion of said boom to selective rotation of said given axis thereof about an axis normal to said given axis of said boom only;
j. means for limiting movement of said pipe clamp means with respect to said elongated rigid member to selective rotation of said given clamping axis of said pipe clamp means about an axis normal thereto; and
k. means for selectively opening and closing said pipe clamp means about said clamping axis.

* * * * *